US012619877B2

(12) United States Patent
Cho et al.

(10) Patent No.: US 12,619,877 B2
(45) **Date of Patent: \*May 5, 2026**

(54) NEURAL NETWORK METHOD AND APPARATUS

(71) Applicant: Samsung Electronics Co., Ltd., Suwon-si (KR)

(72) Inventors: Minkyoung Cho, Incheon (KR); Wonjo Lee, Uiwang-si (KR); Seungwon Lee, Ansan-si (KR)

(73) Assignee: Samsung Electronics Co., Ltd., Suwon-si (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/752,163

(22) Filed: Jun. 24, 2024

(65) Prior Publication Data

US 2024/0346317 A1 Oct. 17, 2024

Related U.S. Application Data

(63) Continuation of application No. 16/835,532, filed on Mar. 31, 2020, now Pat. No. 12,045,723.

(30) Foreign Application Priority Data

Sep. 16, 2019 (KR) ........................ 10-2019-0113527

(51) Int. Cl.
*G06N 3/082* (2023.01)
*G06N 3/04* (2023.01)

(52) U.S. Cl.
CPC ............... *G06N 3/082* (2013.01); *G06N 3/04* (2013.01)

(58) Field of Classification Search
CPC ................................. G06M 3/082; G06M 3/04
USPC ........................................................... 706/25
See application file for complete search history.

(56) References Cited

U.S. PATENT DOCUMENTS

| | | | |
|---|---|---|---|
| 8,301,576 | B2 | 10/2012 | Meng et al. |
| 9,710,265 | B1 | 7/2017 | Temam et al. |
| 10,096,134 | B2 | 10/2018 | Yan et al. |
| 2008/0082468 | A1 | 4/2008 | Long et al. |
| 2013/0231783 | A1 | 9/2013 | Krata et al. |
| 2016/0328647 | A1 | 11/2016 | Lin et al. |

(Continued)

FOREIGN PATENT DOCUMENTS

| | | |
|---|---|---|
| CN | 103210578 A | 7/2013 |
| CN | 106779068 A | 5/2017 |
| CN | 108416423 A | 8/2018 |
| KR | 10-2018-0092810 A | 8/2018 |
| KR | 10-2019-0018885 A | 2/2019 |

OTHER PUBLICATIONS

Carreira, et al., "Learning-compression—algorithms for neural network pruning", CVPR 2018, 2018 (Year: 2018).\*

(Continued)

*Primary Examiner* — Tsu-Chang Lee
(74) *Attorney, Agent, or Firm* — NSIP Law

(57) ABSTRACT

A method and apparatus for the pruning of a neural network is provided. The method sets a weight threshold value based on a weight distribution of layers included in a neural network, predicts a change of inference accuracy of a neural network by pruning of each layer based on the weight threshold value, determines a current subject layer to be pruned with a weight threshold value among the layers included in the neural network, and prunes a determined current subject layer.

18 Claims, 12 Drawing Sheets

(56)          References Cited

U.S. PATENT DOCUMENTS

| | | | |
|---|---|---|---|
| 2016/0358070 A1 | 12/2016 | Brothers et al. | |
| 2017/0193361 A1 | 7/2017 | Chilimbi et al. | |
| 2017/0255832 A1 | 9/2017 | Jones et al. | |
| 2017/0337471 A1* | 11/2017 | Kadav | G06V 20/52 |
| 2018/0046919 A1 | 2/2018 | Li et al. | |
| 2018/0232640 A1 | 8/2018 | Ji et al. | |
| 2019/0057308 A1 | 2/2019 | Cho et al. | |
| 2019/0197406 A1 | 6/2019 | Darvish Rouhani et al. | |
| 2019/0244097 A1 | 8/2019 | Notsu et al. | |
| 2019/0362235 A1 | 11/2019 | Xu et al. | |
| 2020/0184333 A1 | 6/2020 | Oh | |
| 2020/0311549 A1* | 10/2020 | Wang | G06N 3/045 |

OTHER PUBLICATIONS

Luo, et al., "ThiNet: a filter level pruning method for deep neural network compression", ICCV 2017, 2017 (Year: 2017).*

Han, et al., "Deep compression: compressing deep neural networks with pruning, trained quantzation and Huffman codingi", arXiv:1510. 00149v5 [cs.CV] Feb. 15, 2016 (Year: 2016).*

Mrázová, Iveta, and Zuzana Petíková. "Fast Sensitivity-Based Training of BP-Networks." *International Conference on Artificial Neural Networks*. Springer, Cham, 2014. (8 pages in English).

Han, Song, et al. "Learning both weights and connections for efficient neural networks." (2015). (9 pages in English).

Lee et al. "Snip: Single-shot network pruning based on connection sensitivity." *Conference paper at ICLR 2019* (2018). (15 pages in English).

Extended European Search Report issued on Dec. 22, 2020 in counterpart European Patent Application No. 20182765.6 (7 pages in English).

De Jorge, Pau, et al. "Progressive skeletonization: Trimming more fat from a network at initialization." (2020). (19 pages in English).

Chinese Office Action Issued on Mar. 10, 2025, in Counterpart Chinese Patent Application No. 202010175255.7 (21 Pages in English, 11 Pages in Chinese).

* cited by examiner

INPUT
LAYER
(101)

HIDDEN
LAYER 1
(103)

HIDDEN
LAYER 2
(105)

OUTPUT
LAYER
(107)

| 0.9 | 0 | 0 | 0.6 | 0.7 | 1.2 |
|-----|-----|-----|-----|-----|-----|
| 1.2 | 1.3 | 1.1 | 1.0 | 0 | 1.1 |
| 1.4 | 1.3 | 1.3 | 0 | 0.2 | 0.5 |
| 1.0 | 0.2 | 0 | 0.1 | 0.1 | 0.2 |
| 0.1 | 0 | 0.1 | 0.2 | 0 | 0 |
| 0.1 | 0.2 | 0 | 0.1 | 0 | 0.2 |

KERNEL $_{n\_k}$

PRUNING (FOR EXAMPLE, WEIGHT THRESHOLD VALUE $\tau = 0.5$)

240

| 0.9 | 0 | 0 | 0.6 | 0.7 | 1.2 |
|-----|-----|-----|-----|-----|-----|
| 1.2 | 1.3 | 1.1 | 1.0 | 0 | 1.1 |
| 1.4 | 1.3 | 1.3 | 0 | 0 | 0 |
| 1.0 | 0 | 0 | 0 | 0 | 0 |
| 0 | 0 | 0 | 0 | 0 | 0 |
| 0 | 0 | 0 | 0 | 0 | 0 |

KERNEL $_{n\_k}$

PREPARE PRUNING DATA SET

GIVEN DATA SET
(ex., ImageNet database, MNIST database,
unknown database, etc)

FIRST PRUNING DATA SET

"SAME"

511

GIVEN DATA SET

522

SECOND PRUNING DATA SET

"RANDOM EXTRACT FOR CLASS"

521

GIVEN DATA SET

WEIGHT THRESHOLD VALUE ($\tau$)

$\tau = ( Z \cdot \sigma ) + \mu$ 0.15

Z = 0.39

0  Z          W

NEURAL NETWORK METHOD AND APPARATUS

CROSS-REFERENCE TO RELATED APPLICATION

This application is a Continuation Application of U.S. application Ser. No. 16/835,532, filed on Mar. 31, 2020, which claims the benefit under 35 USC § 119(a) of Korean Patent Application No. 10-2019-0113527, filed on Sep. 16, 2019, in the Korean Intellectual Property Office, the entire disclosures of which are incorporated herein by reference for all purposes.

BACKGROUND

1. Field

The following description relates to neural network methods and apparatuses.

2. Description of Related Art

A neural network is a processor-implemented computing system which is implemented by referring to a computational architecture.

An apparatus processing a neural network may implement a large amount of complex operations on input data. As the input data and the training operations of a neural network increase, connectivity of an architecture forming a neural network may be complicated, accuracy of past training data may be increased, and an overfitting problem may be generated in which reliability of a prediction value on new data is lowered instead of an increase of accuracy with respect to previous training data. Furthermore, the increase in the complexity of a neural network may cause an excessive increase in the memory assignment amount, and result in an inefficient performance in the miniaturization and commercialization of the related device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented neural network method includes setting a weight threshold value to prune the neural network to a target pruning rate, based on a determined weight distribution; pruning plural layers of the neural network based on the weight threshold value; predicting a change in inference accuracy of the pruned plural layers of the neural network based on an input pruning data set; determining a current subject layer to be pruned among each of the layers of the neural network, based on the predicted change in inference accuracy; and generating a pruned neural network by pruning the determined current subject layer.

The pruning data set may be a predetermined number of data sources that are randomly extracted from each class included in a given data set.

The method may further include determining a weight distribution of the layers of the neural network.

The current subject layer may be determined to be a layer that is predicted to have a lowest sensitivity to the predicted change in inference accuracy among layers other than a previously pruned layer.

The predicting of the change in inference accuracy may include calculating a sensitivity for each of the plural layers based on a difference between an inference accuracy before pruning on each layer is performed, and an inference accuracy after pruning on each of the plural layers is performed.

The layer that is predicted to have the lowest sensitivity may correspond to a layer that is predicted to have a least effect on a decrease in the inference accuracy of the neural network.

The setting of the weight threshold value may include setting a weight value corresponding to the target pruning rate to be the weight threshold value when the determined weight distribution corresponds to a standard normal distribution.

The pruning of the current subject layer may include pruning the current subject layer by adjusting a pruning rate of weights of the current subject layer by updating the weight threshold value until the inference accuracy of the neural network based on the pruning data set is decreased to a threshold accuracy.

The updating of the weight threshold value may include increasing a current weight threshold value when the inference accuracy of the neural network that includes weights pruned to the current weight threshold value is not decreased to the threshold accuracy.

The determining of the current subject layer and the pruning of the determined current subject layer may be repeatedly performed until a number of all layers or at least all of the plural layers have been pruned.

The pruning data set may include one of a data set generated by randomly extracting a predetermined number of data sources for each class included in the given data set, or a data set generated by selecting valid classes from the pruning data set and randomly extracting a predetermined number of data sources for each selected valid class.

The providing of the pruning data set may include randomly extracting samples of the predetermined number of data sources from each class included in the given data set; determining a label corresponding to each of the randomly extracted samples by performing inference on the randomly extracted samples with the neural network; determining classes having a rate of a most frequent label that is equal to or greater than a predetermined accuracy among classes included in the given data set, to be valid classes; and randomly extracting a predetermined number of data sources from each of the determined valid classes, wherein the pruning data set is provided based on the predetermined number of data sources randomly extracted from the determined valid classes.

The generating of the pruned neural network may be performed without retraining of the pruned neural network using the pruning data set.

The method may further include implementing the generated pruned neural network for captured data.

In another general aspect, a neural network apparatus include one or more processors configured to set a weight threshold value to prune the neural network to a target pruning rate, based on a determined weight distribution; prune plural layers of the neural network based on the weight threshold value; predict a change in inference accuracy of the pruned plural layers of the neural network based on an input pruning data set; determine a current subject layer to be pruned with a weight threshold value among each of the layers of the neural network, based on the predicted change in inference accuracy; and generate a pruned neural network by prune the determined current subject layer.

The pruning data set may be a predetermined number of data sources that are randomly extracted from each class included in a given data set.

The one or more processors may be further configured to determine a weight distribution of the layers of the neural network.

The apparatus may further include a memory storing instructions that, when executed by the one or more processors, configure the one or more processors to perform the determining of the weight distribution of the layers, the setting of the weight threshold, the predicting of the change in inference accuracy, the determining of the current subject layer, and the pruning of the determined current subject layer.

For the determining of the current subject layer, the one or more processors may be configured to determine a layer that is predicted to have a lowest sensitivity to the predicted change in inference accuracy among layers other than a previously pruned layer, to be the current subject layer.

For the predicting of the change in inference accuracy, the one or more processors may be configured to calculate a sensitivity for each of the plural layers based on a difference between an inference accuracy before pruning of each of the plural layers is performed, and an inference accuracy after pruning of each of the plural layers is performed.

The layer that is predicted to have the lowest sensitivity corresponds to a layer that may be predicted to have a least effect on a decrease in the inference accuracy of the neural network.

The one or more processors may be configured to set the weight value corresponding to a target pruning rate to be the weight threshold value when the determined weight distribution corresponds to a standard normal distribution.

The one or more processors may be configured to prune the current subject layer by adjusting a pruning rate of weights of the current subject layer by updating the weight threshold value until the inference accuracy of a neural network based on the pruning data set is decreased to a threshold accuracy.

The updating of the weight threshold value may be increasing a current weight threshold value when the inference accuracy of the neural network that includes weights pruned to the current weight threshold value is not decreased to the threshold accuracy.

The determining of the current subject layer and the pruning of the determined current subject layer may be repeatedly performed by the one or more processors until a number of all layers or at least all of the plural layers have been pruned.

The pruning data set may include one of a data set generated by randomly extracting a predetermined number of data sources for each class included in the given data set, or a data set generated by selecting valid classes from the pruning data set and randomly extracting a predetermined number of data sources for each selected valid class.

The one or more processors may be configured to provide the pruning data set by randomly extracting samples of the predetermined number of data sources from each class included in the given data set, determining a label corresponding to each of the randomly extracted samples by performing inference on the randomly extracted samples with the neural network, determining classes having a rate of a most frequent label that is equal to or greater than a predetermined accuracy among classes included in the given data set, to be valid classes, and randomly extracting a predetermined number of data sources from each of the determined valid classes.

The apparatus may implement the generated pruned neural network for captured data.

The apparatus may be any one of a personal computer (PC), a server device, a mobile device, a smart phone, an autonomous vehicle, a robotics device, a tablet device, an augmented reality (AR) device, and an internet-of-things (IoT) device, and the one or more processors are configured to perform any one of voice recognition and image recognition using the generated pruned neural network.

In a general aspect, a processor implemented method includes determining a weight distribution of layers of a neural network; determining an initial weight threshold based on the determined weight distribution; determining a sensitivity of each layer of the neural network, and select a layer of the neural network having a lowest sensitivity as a current subject layer; and generating a pruned neural network by pruning weights less than or equal to the determined weight threshold in the current subject layer.

The selected layer that has the lowest sensitivity corresponds to a layer that may be predicted to have a least effect on a decrease in the inference accuracy of the neural network.

Other features and aspects will be apparent from the following detailed description, the drawings, and the claims.

BRIEF DESCRIPTION OF THE DRAWINGS

FIGS. 2A and 2B illustrate examples of neural network pruning in accordance with one or more embodiments.

FIG. 4 illustrates an example of a pruning data set in accordance with one or more embodiments.

FIGS. 5A to 5C illustrate types of a pruning data set in accordance with one or more embodiments.

Figure 1:
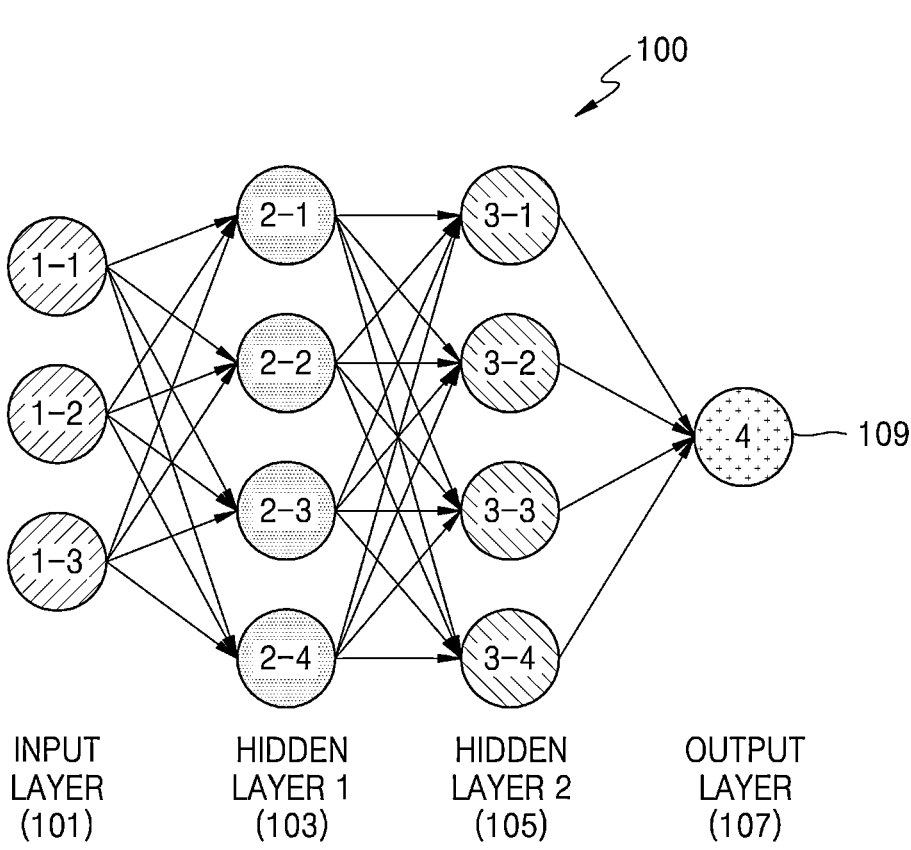
FIG. 1 illustrates an example of a neural network in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

FIG. 1 illustrates an example of a neural network 100, in accordance with one or more embodiments.

Technological automation of pattern recognition or analyses, for example, has been implemented through processor implemented neural network models, as specialized computational architectures, that after substantial training may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

Referring to FIG. 1, the neural network 100 may be a deep neural network (DNN), as a non-limiting example. The DNN may include a plurality of layers. For example, the deep neural network may include an input layer to which input data is applied, an output layer for outputting a result derived through prediction based on training and the input data, and a plurality of hidden layers for performing a neural network operation between the input layer and the output layer.

In such an example, the DNN may be one or more of a fully connected network, a convolution neural network, a recurrent neural network, and the like, or may include different or overlapping neural network portions respectively with such full, convolutional, or recurrent connections, according to an algorithm used to process information. The neural network 100 may be configured to perform, as non-limiting examples, object classification, object recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a data set, as non-limiting examples. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Hereinafter, in an example, the input layer may correspond to the lowest layer of the neural network, and the output layer may correspond to the highest layer of the neural network. A layer order may be assigned and named sequentially from the output layer that is the highest layer to the input layer that is the lowest layer. For example, Hidden Layer 2 may correspond to a layer higher than Hidden Layer 1 and the Input Layer, but lower than the Output Layer.

In the DNN that includes a plurality of layers, a relatively high layer of adjacent layers may receive a value obtained by multiplying an output value of a relatively low layer by a weight, and applying a bias thereto, and outputs a certain operation value, and the output value may be applied to another higher layer adjacent to the higher layer in a similar manner, e.g., as an input.

A method of training a neural network is referred to as deep learning, and as described above, the deep learning may use various algorithm approaches, such as in a convolution neural network or a recurrent neural network.

The training of a neural network may mean determining and updating weights and biases between layers or between a plurality of nodes (or neurons) that belong to different layers of adjacent layers. However, such reference to "neurons" is not intended to impart any relatedness with respect to how the neural network architecture computationally maps or thereby intuitively recognizes information, and how a human's neurons operate. In other words, the term "neuron" is merely a term of art referring to the hardware implemented nodes of a neural network, and will have a same meaning as a node of the neural network.

For example, the weight and biases of a layer structure or between layers or neurons may be collectively referred to as connectivity of a neural network. Accordingly, the training of a neural network may denote establishing and training connectivity.

Referring to FIG. 1, each of a plurality of layers 101-107 may include a plurality of nodes.

Referring to FIG. 1, a plurality of nodes of one layer and a plurality of nodes of an adjacent layer are fully-connected. For example, Node 3-1 of Hidden Layer 2 105 is connected to all nodes, that is, Node 2-1 to Node 2-4, of Hidden Layer 1 103, and receives inputs of values obtained by multiplying output values of the respective nodes by certain weights.

Data input to the input layer 101 may be processed through a plurality of hidden layers and thus a final output value 109 is output from the output layer 107. In this state, as the weight increases, connectivity between corresponding two nodes is reinforced, and as the weight decreases, connectivity between two nodes is weakened. For example, the weight may have a value between 0 and 1, and when the weight is 0, no connectivity exists between two nodes. However, a numerical range of the weight is not limited thereto, and may be diversified according to the implementation method of a neural network, e.g., according to the various ranges and activation functions.

As connectivity increases through the weight, the connectivity of a neural network may be reinforced and complexity may be increased. Accordingly, a memory assignment amount for storing the weight may increase, and thus, the work performance speed of an overall neural network may be lowered and efficiency may be reduced. Accordingly, a compression method to reduce the size of a neural network, reduce system costs, and reduce the amount of computations performed in the implementation of a neural network while maintaining performance of the neural network is beneficial.

Figure 2A:
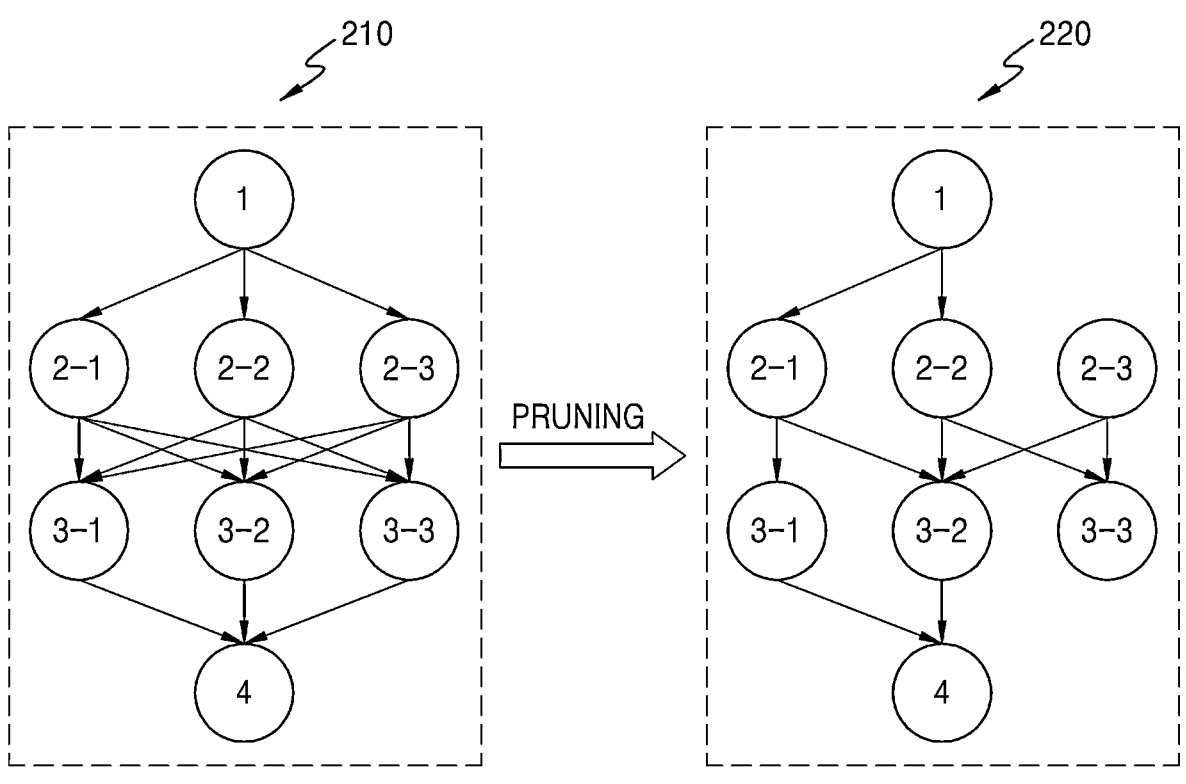

FIGS. 2A and 2B illustrate examples of the pruning of a neural network 210 in accordance with one or more embodiments.

Referring to FIG. 2A, the neural network 210 corresponds to a neural network before pruning is performed, and a neural network 220 corresponds to a neural network after pruning is performed. The pruning may support and provide functionality to perform both coarse-grained neural network pruning (for example, the pruning of channels, kernels, or nodes from the neural network model), as well as more surgical, fine-grained neural network pruning (for example, the pruning of individual weights from the neural network model).

In an example, a connection or connected relationship is formed between all paired neuron or node combinations included in two different adjacent layers in the neural network 210. Specifically, since the neural network 210 is a fully-connected neural network, weights that denote connection strength between two neurons belonging to different adjacent layers included in the neural network 210 may be greater than 0. Accordingly, when connectivity between neurons of all adjacent layers exists, the complexity of an overall neural network may increase, and thus, the accuracy and reliability of a prediction result of a neural network may be reduced due to the overfitting.

To reduce the complexity of a neural network, pruning may be performed on the neural network.

A neural network pruning may mean the compression or removal of the connectivity between nodes, for example, as illustrated in FIG. 2A, when a weight between the nodes connected in the neural network 210 is less than or equal to a certain threshold value. For example, when a weight between Node 1 and Node 2-3 in the neural network 210 is less than or equal to a certain threshold value, the pruning process may set the weight between Node 1 and Node 2-3 in the neural network 210 to 0, therefore removing the connectivity between Node 1 and Node 2-3 as shown in the pruned neural network 220. Similarly, in the pruned neural network 220, connectivity between some nodes in the neural network 210 may be weakened or removed.

Each layer of a neural network may be analyzed to determine nodes and node connections of the neural network which are appropriate for pruning. In this state, layers to be pruned and weights associated with those nodes may be determined unless inference accuracy of a neural network, that is, the output of a neural network, is excessively reduced.

While a pruning process is performed among the weights of layers included in a neural network, a connection between neurons which have a value that is less than a predefined weight threshold value, may be determined, and a connection relationship between neurons having such a weight may be removed or weakened.

Referring to FIG. 2B, a result of performing a pruning process on a $KERNEL_{n\_k}$ 230 (n and k are natural numbers) that is the k-th kernel of the n-th layer (convolutional layer) in a neural network, is illustrated. As a setting for neural network pruning, for example, a weight threshold value $\tau$ is assumed to be 0.5.

In an example, the weight threshold may be a layer-wise weight threshold which may be computed based on the statistical distribution of full dense weights in each layer and weight pruning may be performed to mask out those weights that are less than the corresponding layer-specific threshold. In other examples, a single weight threshold may be defined for the entire network. In some examples, a layer-specific weight threshold may enhance the speed of the pruning and the accuracy of the resulting pruned network.

Before pruning, the $KERNEL_{n\_k}$ 230 may have various values of weights. During the pruning process, among the weights of the $KERNEL_{n\_k}$ 230, all weights which are less than or equal to a weight threshold value ($\tau$=0.5) may be pruned to 0, and a $KERNEL_{n\_k}$ 240 that is pruned may be generated. As such, the $KERNEL_{n\_k}$ 240 that is pruned may weaken the connectivity between adjacent nodes, compared to the $KERNEL_{n\_k}$ 230, and thus, the amount or number of computational operations between adjacent nodes may be reduced due to the weight having a value of 0.

Figure 3:
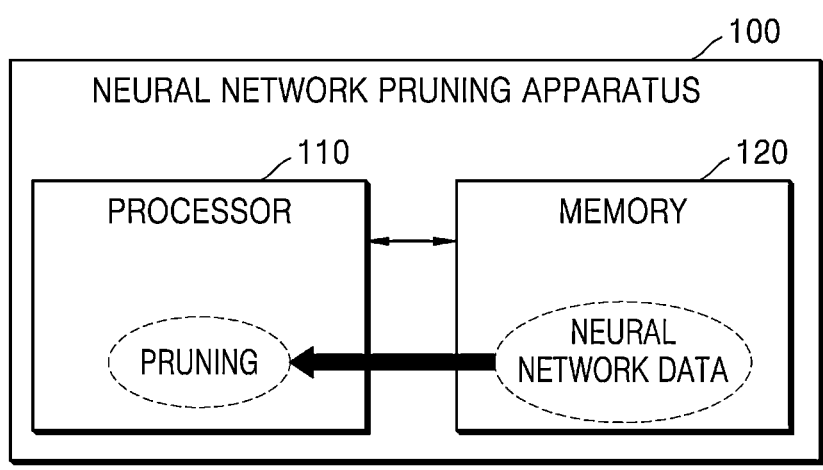
FIG. 3 illustrates a block diagram of an example of a hardware configuration of a neural network apparatus in accordance with one or more embodiments.

FIG. 3 is a block diagram of a hardware configuration of a neural network apparatus 100 in accordance with one or more embodiments.

Referring to FIG. 3, the neural network apparatus 100 may include a processor 110 and a memory 120. In an example, the neural network apparatus 100 may further store instructions, e.g., in memory 120, which when executed by the processor 110 configure the processor 1110 to implement one or more or any combination of operations herein. The processor 110 and the memory 120 may be respectively representative of one or more processors 110 and one or more memories 120. Example elements related to the present examples are illustrated in the neural network apparatus 100 illustrated in FIG. 3. Accordingly, the neural network apparatus 100 may further include other elements or components in addition to the illustrated elements illustrated in FIG. 3.

The neural network apparatus 100 corresponds to a computing device that includes pruning of a neural network. For example, the neural network apparatus 100 may be, as non-limiting examples, a personal computer (PC), a server, a mobile device, and the like, and may further correspond to, or be an apparatus provided in, autonomous vehicles, robotics, smartphones, tablet devices, augmented reality (AR) devices, Internet of Things (IoT) devices, and similar devices, which perform voice recognition and image recognition by implementing a neural network, but the present disclosure is not limited thereto, and may correspond to various types of devices.

The processor 110 is a hardware configuration for performing general control functions to control operations of the neural network apparatus 100. For example, the processor 110 may generally control the neural network apparatus 100 by executing instructions stored in the memory 120 of the neural network apparatus 100. The processor 110 may be implemented by, as non-limiting examples, a central processing unit (CPU), a graphics processing unit (GPU), an application processor (AP), a neural processing unit (NPU), and the like, which are provided in the neural network g apparatus 100.

The memory 120, which is hardware for storing various pieces of neural network data processed by the processor 110, may store, for example, parameters of a neural network including pieces of pruning data on the neural network, data sets to be input to the neural network, and the like. Furthermore, the memory 120 may store various applications to be driven by the processor 110, for example, applications for neural network pruning, neural network driving applications, drivers, and the like.

The memory 120 may include at least one of volatile memory or nonvolatile memory. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. The volatile memory may include dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), and the like. Furthermore, the memory 120 may include at least one of hard disk drives (HDDs), solid state drive (SSDs), compact flash (CF) cards, secure digital (SD) cards, micro secure digital (Micro-SD) cards, mini secure digital (Mini-SD) cards, extreme digital (xD) cards, or Memory Sticks.

Referring again to FIG. 3, the processor 110 sets a weight threshold value to prune a neural network to a target pruning rate, based on a weight distribution of layers included in a neural network. In an example, assuming that a weight distribution corresponds to the Gaussian distribution like a standard normal distribution, the processor 110 may set a weight value corresponding to a target pruning rate to a weight threshold value. However, the processor 110 may set a weight threshold value suitable for neural network pruning, by using other various statistic distributions in addition to the standard normal distribution. For example, the weight threshold may be determined based on a statistic value that describes weight values within the layer (e.g., a mean, median, mode, standard deviation, variance, etc. of the weight values of a layer).

The processor 110 may perform neural network pruning by repeatedly measuring and verifying inference accuracy of a neural network on a pruning data set by inputting the pruning data set to the neural network. Preparation of the pruning data set is described in detail with reference to the following drawings.

The processor 110 may predict or determines an effect of the pruning of each layer of the neural network based on the weight threshold value on a change in the inference accuracy of a neural network, by using a prepared pruning data set. The prediction of an effect may be performed by calculating the sensitivity for each layer based on a difference between inference accuracy before each layer is pruned and inference accuracy after each layer is pruned. The sensitivity may refer to the manner in which the output of a neural network is influenced by the input to the neural network and/or the weight perturbations of the neural network. The sensitivity measure may be defined as the mathematical expectation of output deviation due to expected input deviation with respect to overall input patterns in a continuous interval, and may be used to determine the response of the output to the model when various input parameters are introduced to the model.

The processor 110 may determine, based on the predicted effect, a current subject layer to be the layer to be pruned, with the weight threshold value among the layers included in the neural network. The processor 110 may determine that a layer which is predicted to have the lowest sensitivity among other layers other than a previously pruned layer, to be the current subject layer. In other words, the layer that is predicted to have the lowest sensitivity may mean a layer that is predicted to have the least effect on a decrease in the inference accuracy of a neural network.

When the current subject layer is determined, the processor 110 prunes the determined current subject layer. Specifically, the processor 110 may prune the current subject layer by adjusting a pruning rate of weights of the current subject layer by updating the weight threshold value until the inference accuracy of a neural network using the pruning data set, is determined to have decreased to a threshold accuracy.

After the pruning of the current subject layer is completed, the processor 110 may then search for subject layers to be pruned in the other layers of the neural network, and may repeatedly perform pruning on the newly found subject layers, thereby performing pruning on the overall neural network. The completion of the pruning of the overall neural network may be determined when the neural network pruning has reached an initially set target pruning rate, or when the pruning process is completed on all layers included in the neural network.

Figure 4:
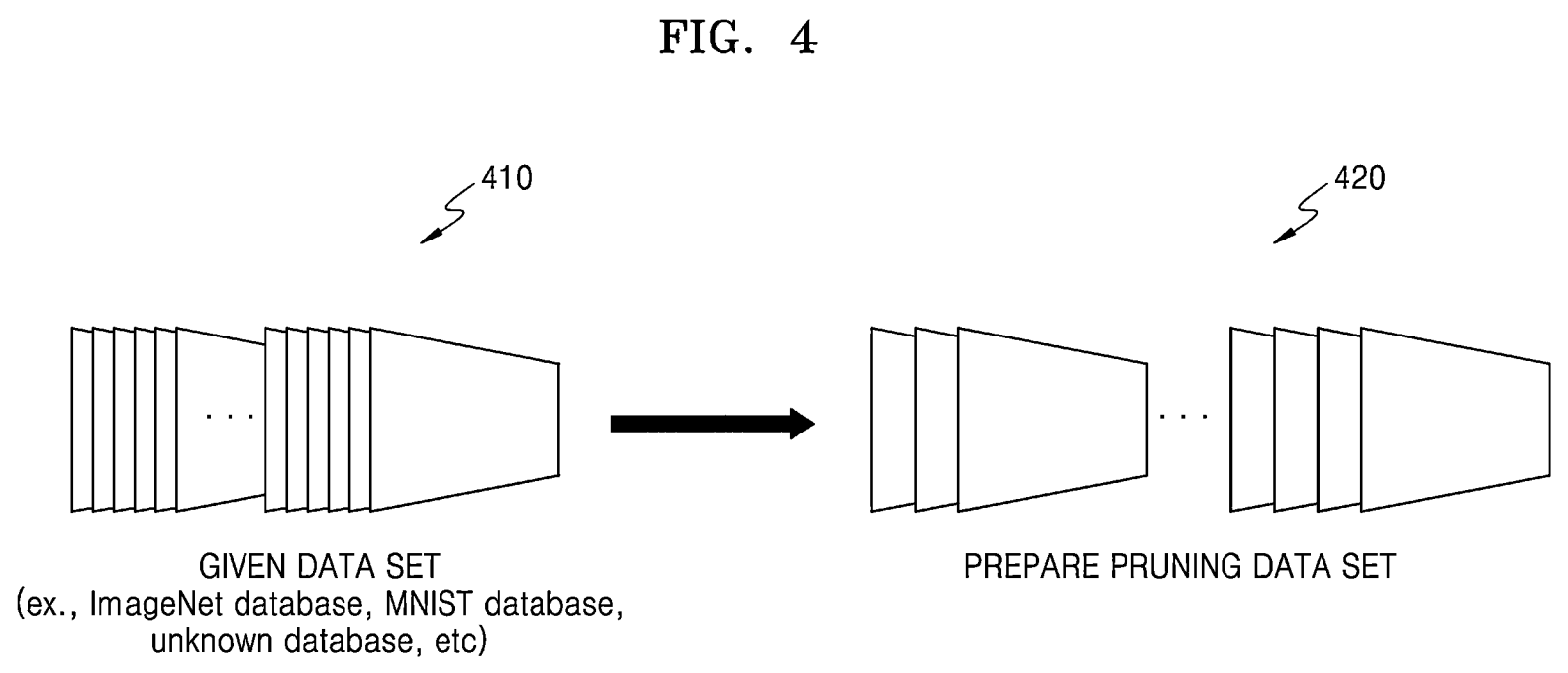

FIG. 4 illustrates a pruning data set 420 in accordance with one or more embodiments.

Referring to FIG. 4, the pruning data set 420 may be a data set used to measure and verify a change in the inference accuracy of a neural network, for example, sensitivity for each layer, while pruning is performed on a neural network.

The pruning data set 420 may be prepared from an initially given data set 410. In this example, the given data set 410 may be, as non-limiting examples, a public data set such as an ImageNet database, a Modified National Institute of Standards and Technology (MNIST) database, and the like. However, various other types of databases may be implemented.

The pruning data set 420 may be prepared to reduce or avoid a pruning phenomenon of overfitting to the given data set 410 occurring when the given data set 410 is used as it is, and to shorten a neural network pruning time. However, the preparation process of the pruning data set 420 may vary according to the types of the given data set 410. Traditionally, overfitting may be due to biased or excessive training, which may lead to a reduction in a performance of the neural network. By pruning the neural network, it is possible to remove or alleviate unnecessary parameters that may cause such overfitting. Thus, the final training, as well as the performance of neural networks, may be enhanced through the pruning of the neural networks.

Figure 5A:
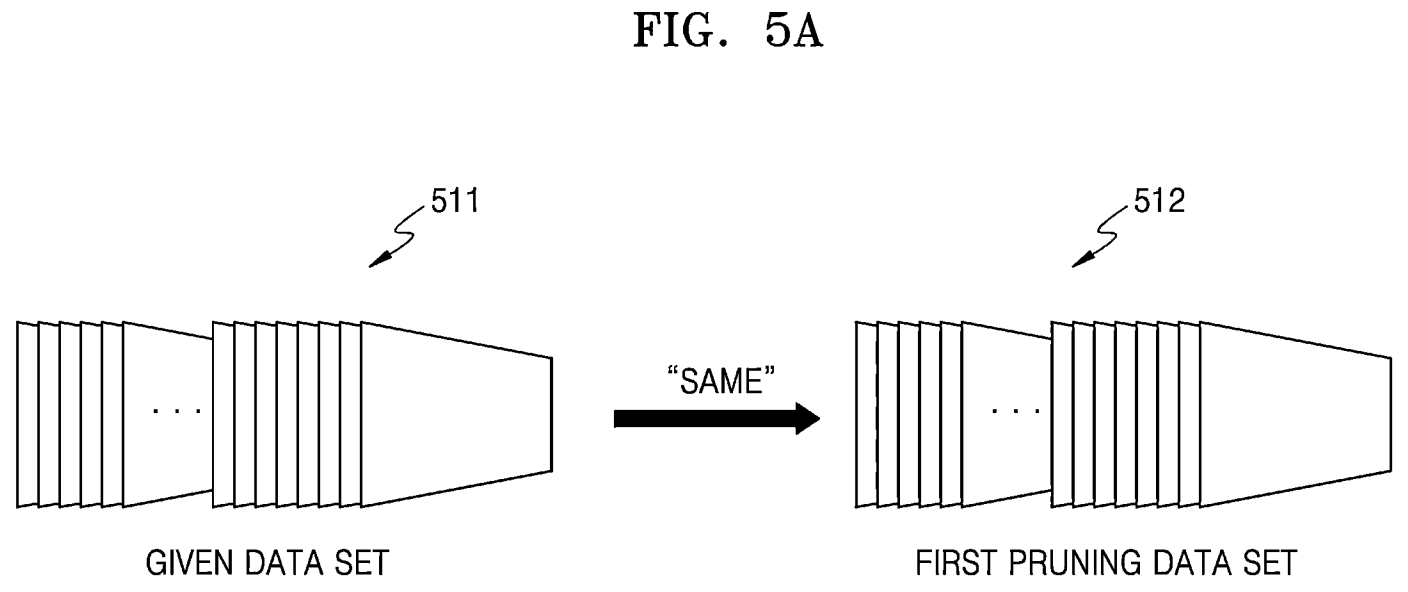
Figure 5B:
Figure 5B:
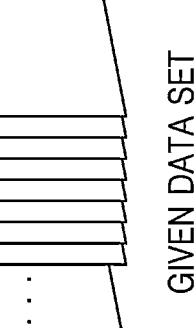
Figure 5C:
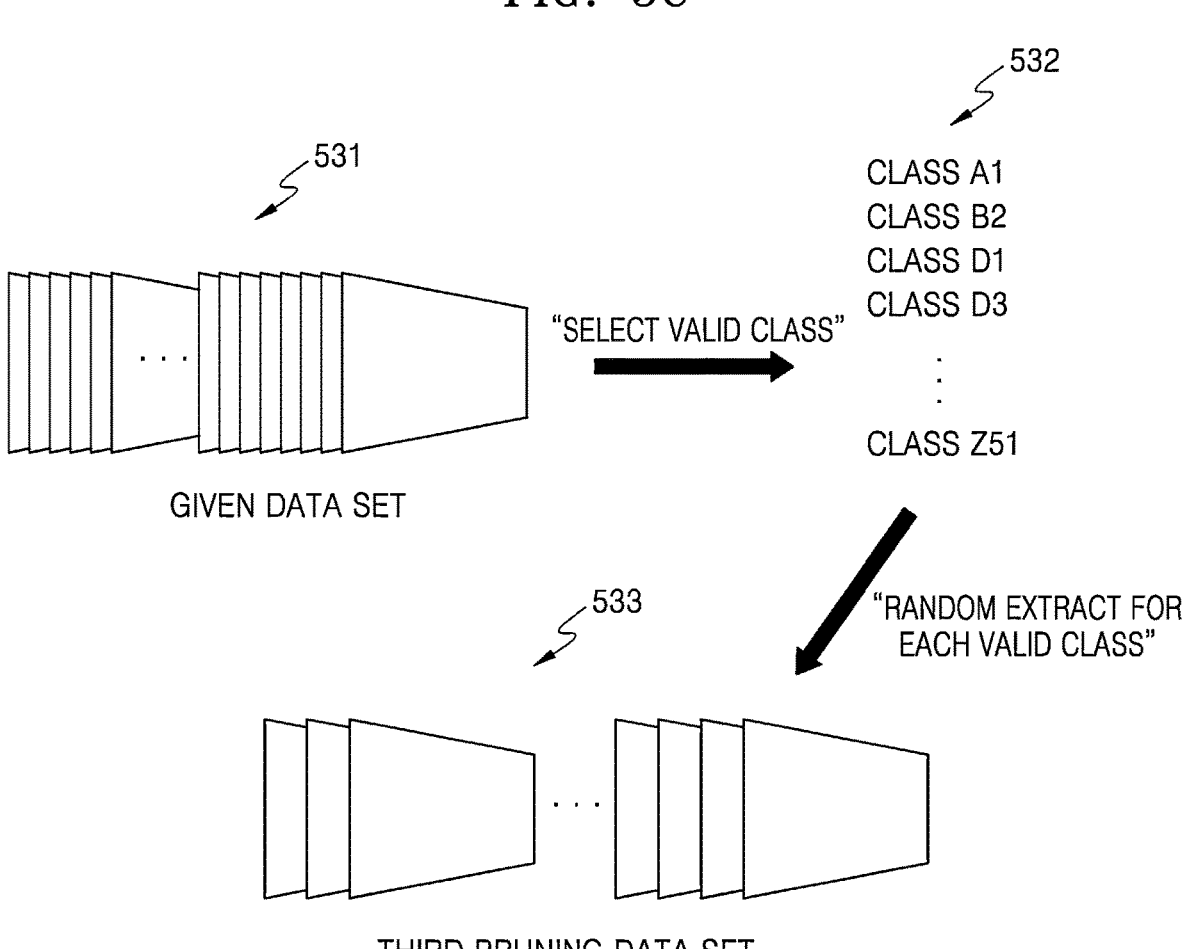

FIGS. 5A to 5C illustrate types of pruning data sets in accordance with one or more embodiments.

Referring to FIG. 5A, a pruning data set 512 (a first-type of pruning data set) may correspond to the same data set as a given data set 511. As described above, in the neural network pruning, when it is expected that the overfitting problem does not occur when using the given data set 511, a data set that is the same as the given data set 511 may be prepared as the pruning data set 512. For example, when the given data set 511 corresponds to an ImageNet database, the first-type pruning data set may be data sources of several millions to tens of millions of images of the ImageNet database.

Referring to FIG. 5B, a pruning data set 522 (a second-type of pruning data set) may be prepared by randomly extracting a certain number of data sources from each of various classes included in a given data set 521. For example, the given data set 521 may be assumed, i.e., as a non-limiting example, to be a data set that is obtained from the ImageNet database including, as an example, more than one million data sources having about 1,000 classes. In this example, the pruning data set 522 may be a new data set including only data sources that are obtained by randomly extracting about 1 to 10 data sources from each of about 1,000 classes in the given data set 521. The number of data sources to be randomly extracted for each class may be arbitrarily set, and may vary for each class. According to the preparation method described in FIG. 5B, as the size of a data set may be reduced, the neural network pruning processing time may be shortened, and a phenomenon that the pruned neural network is overfitted to a specific database only may be prevented.

Pruning of a typical neural network such as 'Inception-v3' may be performed by implementing the second-type of pruning data set provided in the method described in FIG. 5B based on each of known classes from the ImageNet database.

However, as an inference algorithm for a neural network such as 'Aic-classifier', which trains with its own data set which is unknown, is not identified, there is a demand to select classes that may be validly inferenced by a neural network such as 'Aic-classifier' from among the already defined classes in the ImageNet database.

Referring to FIG. 5C, a given data set 531 may be provided to prune a neural network, such as 'Aic-classifier', that trains with its own unknown data set. The processor 110 of FIG. 3 may generate a pruning data set 533 (a third-type of pruning data set) according to a different preparation method.

Specifically, the given data set 531 is input to a neural network, and the processor 110 may perform inference on data sources, for example, images, of the given data set 531, by implementing the neural network. The processor 110, as a result of the inference of the neural network, may determine a label of each of the data sources for each class of the given data set 531. The label may be an identifier indicating a class to which the data source belongs. The processor 110 selects classes having accuracy over a certain level and determines the selected classes to be valid classes 532. Finally, the processor 110 may randomly extract a certain number of data sources, for example, 1 to 10 data sources, from each of the valid classes 532, and prepare a new data set including the extracted data sources only as the pruning data set 533. However, as described in FIG. 5B, the number of data sources to be randomly extracted for each of the valid classes 532 may be arbitrarily set, and may vary for each class.

Figure 5D:
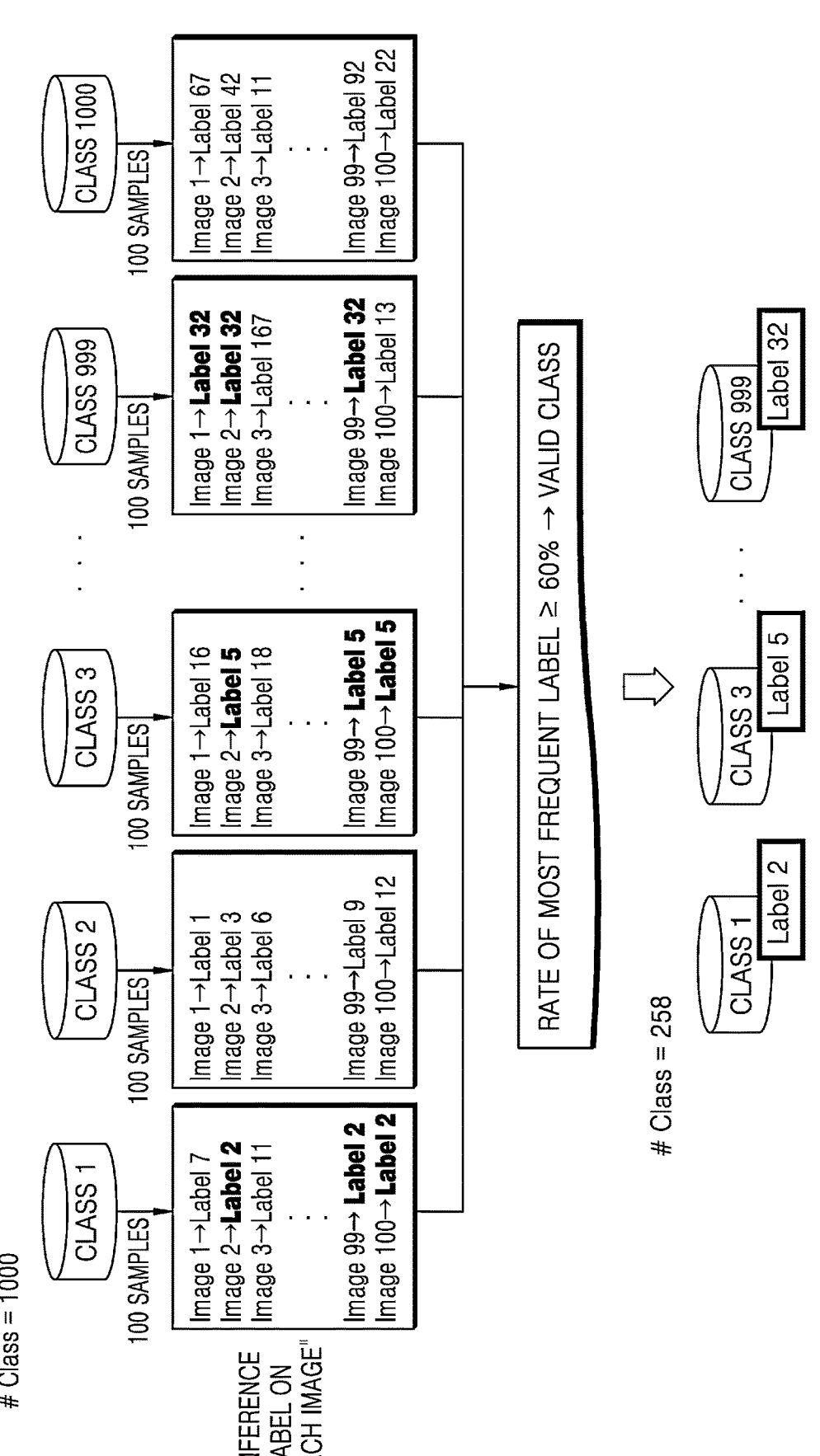
FIG. 5D illustrates an example of a process of preparing the pruning data set of FIG. 5C.

FIG. 5D illustrates in detail a process of preparing the pruning data set (the third-type of pruning data set) of FIG. 5C.

Referring to FIG. 5D, a given data set is assumed to include a total of 1000 classes from CLASS 1 to CLASS 1000. The processor 110 may randomly extract samples of 100 data sources for each class. Then, the processor 110 may perform inference using each data source as inputs, for example, an image, with the neural network, and determine a label related to each of the data sources. The label may be an identifier indicating a class to which the data source belongs.

The processor 110 may determine a class in which a ratio of the most frequent label is over a certain accuracy, for example, 60%, among the overall classes, to be a valid class. Accordingly, the processor 110 may select classes CLASS 1, CLASS 3, . . . , CLASS 999, which satisfy the above condition, as valid classes.

The processor 110 may randomly extract a certain number, for example, 1 to 50, of data sources from each of the valid classes, and prepare a new data set including extracted data sources only as the third-type pruning data set. The number of samples to be randomly extracted for each class, the value of a certain accuracy to select valid classes, and the number of data sources to be randomly extracted from the valid classes may be arbitrarily set, and may vary for each class.

As the processor 110 of the neural network apparatus 100 of FIG. 3 uses the pruning data set prepared by the methods described in FIGS. 5A to 5D, the measurement and verification of inference accuracy in the pruning process of the neural network may be performed.

Figure 6:
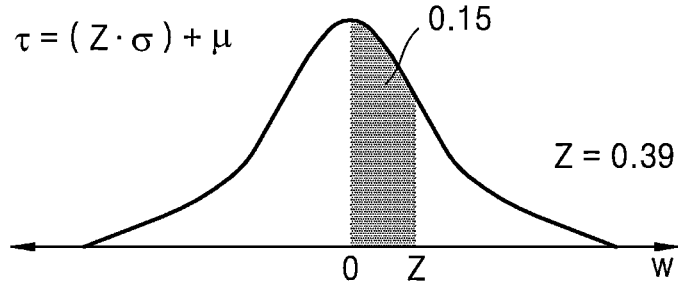
FIG. 6 is an example of a graph illustrating the setting of a weight threshold value for neural network pruning, in accordance with one or more embodiments.

FIG. 6 is a graph illustrating the setting of a weight threshold value for neural network pruning, according to one or more embodiments.

Referring to FIG. 6, the processor 110 sets a weight threshold value to prune a neural network to a target pruning rate, based on a weight distribution of layers included in the neural network. In this state, assuming that a weight distribution corresponds to a Gaussian distribution such as a standard normal distribution, the processor 110 may set a weight value corresponding to a target pruning rate to be a weight threshold value.

Equation 1 below calculates a weight threshold value τ that corresponds to a target pruning rate (α%).

$$\tau = (Z \cdot \sigma) + \mu \qquad \text{Equation 1}$$

Specifically, the processor 110 first obtains a Z value corresponding to the target pruning rate (α %) on a standard normal distribution assumed with respect to the weight distribution of layers included in a neural network. Then, the processor 110 calculates a weight threshold value τ based on a mean μ and a standard deviation σ of weights.

For example, when the target pruning rate (α %) is 30%, it may be calculated that Z=0.39, the mean μ and the standard deviation σ of weights may be additionally calculated, and thus the weight threshold value τ for neural network pruning may be set therethrough.

However, the processor 110 may set a weight threshold value suitable for neural network pruning, based on various other statistical distributions in addition to the standard normal distribution.

Figure 7:
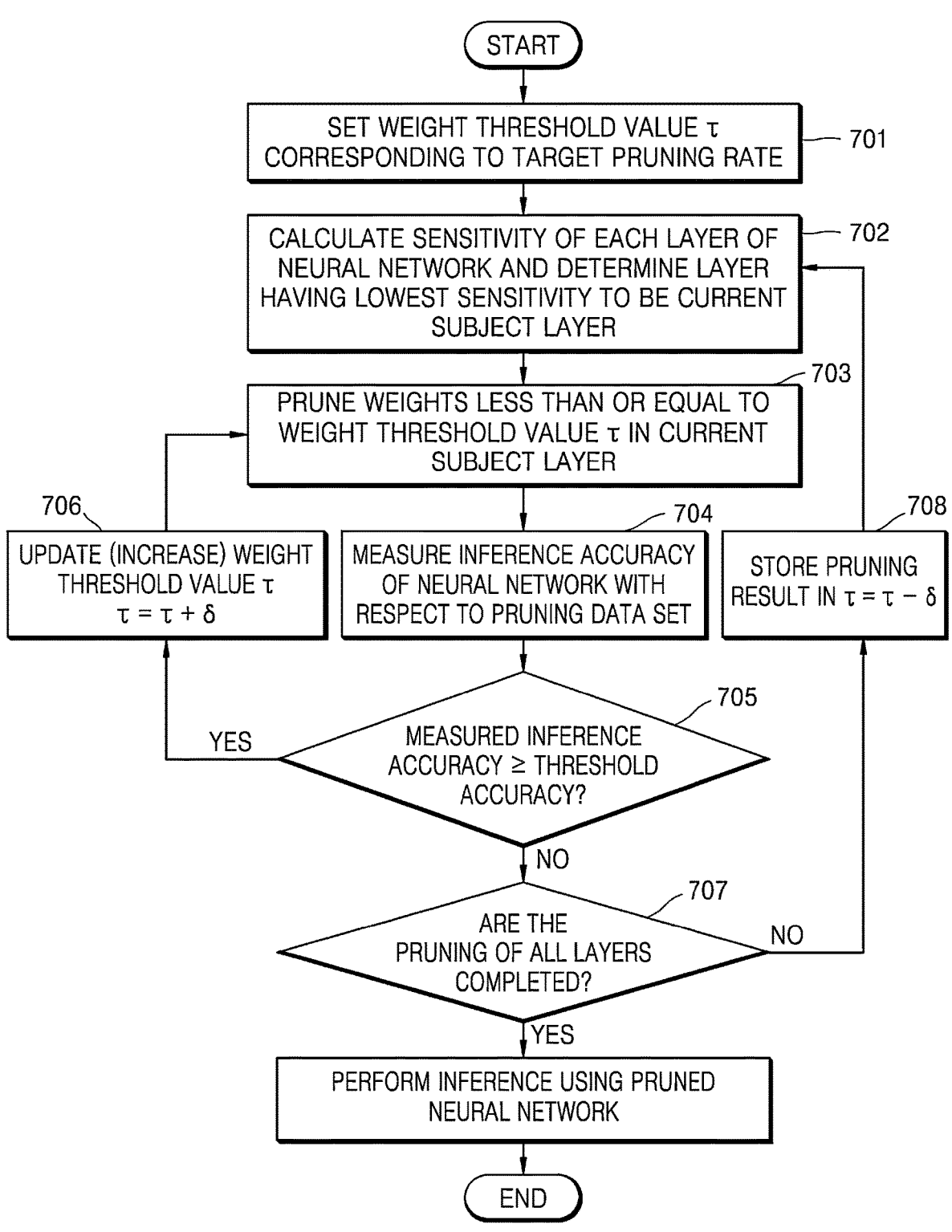
FIG. 7 illustrates an example of a flowchart of a process of performing neural network pruning, in accordance with one or more embodiments.

FIG. 7 illustrates a flowchart of a process of performing neural network pruning, in accordance with one or more embodiments. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, in operation 701, the processor 110 sets a weight threshold value to prune a neural network to a target pruning rate, by using the method described in FIG. 6, based on the weight distribution of layers included in a neural network.

In operation 702, the processor 110 calculates the sensitivity of each layer of the neural network, and determines a layer having the lowest sensitivity to be a current subject layer. In an example, a layer determined to have the lowest sensitivity may correspond to a layer that is predicted to have the least effect on a decrease in the inference accuracy of a neural network by neural network pruning. The processor 110 may use at least one of the pruning data sets described above in FIGS. 5A to 5D for calculation of sensitivity, and may predict an effect on a change of the inference accuracy of a neural network by pruning of each layer based on a weight threshold value, by using the pruning data sets.

The sensitivity may be calculated with Equation 2 below.

$$\text{Let, } \hat{W}_{t,k}^{\tau} = \begin{cases} 0, & \text{if } |x| \le \tau \text{ and } x \text{ in } k^{th} \text{ layer} \\ W_t, & \text{otherwise} \end{cases} \qquad \text{Equation 4}$$

$$\tilde{k} = \underset{k}{\arg\min} \left| P(W_t) - P(\hat{W}_{t,k}^{\tau_0}) \right|$$

Referring to Equation 2, $\tau$ is a weight threshold value. T denotes the order of pruning performed on the layers of a neural network, and k denotes an index of a current subject layer to be pruned. For example, when a current subject layer to be pruned corresponds to a layer to be pruned third, it may be that t=3. $W_t$ denotes a weight at the order t, $$\hat{W}_{t,k}^{\tau}$$

denotes a weight of the k-th layer pruned in the order t with respect to $\tau_0$. $P(W_t)$ and $P(W_t)$ respectively denote the inference accuracy of a neural network using $W_t$ and the inference accuracy of a neural network using $$\hat{W}_{t,k}^{\tau}.$$

In other words, according to Equation 2, the sensitivity may be calculated for each layer based on a difference between the inference accuracy before pruning is performed on each layer and the inference accuracy after pruning is performed on each layer.

In operation 703, the processor 110 prunes weights less than or equal to the weight threshold value $\tau$ in the current subject layer.

In operation 704, the processor 110 measures inference accuracy of a neural network with respect to the pruning data set, according to a result of the pruning of the current subject layer.

In operation 705, the processor 110 compares the measured inference accuracy with the threshold accuracy and determines whether the measured inference accuracy is lower than the threshold accuracy. When the measured inference accuracy is not lower than the threshold accuracy, operation 707 is performed. However, when the measured inference accuracy is lower than the threshold accuracy, operation 706 is performed.

In operation 706, when inference accuracy according to the pruning of a current subject layer by weight threshold value $\tau$ is not decreased to the threshold accuracy, the processor 110 updates the weight threshold value $\tau$ by increasing the weight threshold value $\tau$. For example, the processor 110 updates the weight threshold value $\tau$ by increasing the weight threshold value $\tau$ by $\delta$, as in $\tau=\tau+\delta$. In an example, $\delta$ may be a value that is arbitrarily set based on various factors such as the weight distribution of a neural network, a pruning rate to the current subject layer, and the like.

The processor 110 performs again operations 703 to 705 based on the updated weight threshold value. In other words, the processor 110 updates the weight threshold value until the inference accuracy of a neural network with respect to the pruning data set is decreased to the threshold accuracy, by adjusting the pruning rate of the weights of the current subject layer, thereby pruning the current subject layer.

Operations 703 to 706 may be performed with Equation 3 below.

$$\tilde{\tau} = \max\left\{ \tau : \left| P(W_t) - P(\hat{W}_{t,k}^{\tau}) \right| \le \beta \right\} \qquad \text{Equation 3}$$

$$W_{t+1} = \hat{W}_{t,k}^{\tilde{\tau}}$$

Referring to Equation 3, $\beta$ denotes threshold accuracy, and as described above, when a decrease in the inference accuracy is less than or equal to a certain level, pruning may be performed on the current subject layer while increasing a pruning rate of the current subject layer by increasing the weight threshold value $\tau$.

As a result of the determination in operation 705, when the measured inference accuracy is less than the threshold accuracy, the processor 110 terminates the pruning on the current subject layer and operation 707 is performed.

In operation 707, the processor 110 determines whether the pruning is completed regarding all layers of the neural network. When the pruning on all layers is determined not to be completed, operation 708 is performed.

In operation 708, the processor 110 stores, in the memory 120, a result of the pruning performed just before on the current subject layer and repeatedly performs the operations from operation 702 to perform pruning on a layer of a next order (t+1).

When the pruning on all layers is completed as a result of the determination in operation 707, the processor 110 terminates the neural network pruning.

Referring again to operation 707, when the pruning on all layers has been completed, the neural network pruning process is terminated. However, the examples are not limited thereto, and according to another example, the processor 110 may determine whether the initially set target pruning rate is reached, as the condition for terminating the neural network pruning process. In other words, the processor 110 may control the neural network pruning process to be terminated when the initially set target pruning rate is reached as a result of repeated pruning on the layers of the neural network in operation 707.

In another example, when the target pruning rate is reached or the pruning on all layers is completed, the processor 110 may determine that the condition for terminating the neural network pruning is satisfied.

Typically, the retraining of a neural network is repeatedly performed to reduce a decrease in the accuracy of pruning. However, when the retraining of a neural network is performed, various resources, for example, time, processing resources, and the like, may be needed for the retraining. Accordingly, as a simulation for pruning an Inception-v3 model by 57%, a period of more than 7 days may be utilized when using 6 GPUs, and 2 or 3 days may be utilized for ResNet-101, which is the fastest model.

According to the neural network pruning method performed by the neural network apparatus 100 according to the disclosed examples, since the pruning of a neural network is performed without, for example, the retraining of a neural network using a pruning data set, efficient pruning of a neural network may be achieved. The neural network pruning method may be performed as an example final stage of training, e.g., after training and without retraining, and/or by the inference implementing neural network apparatus, such as a smart phone, and with respect to a captured image. A neural network apparatus of one or more embodiments may be configured to reduce the amount of calculations to process a neural network, thereby solving such a technological problem and providing a technological improvement by advantageously increasing a calculation speed of the neural network apparatus of one or more embodiments over the typical neural network apparatus.

Figure 8:
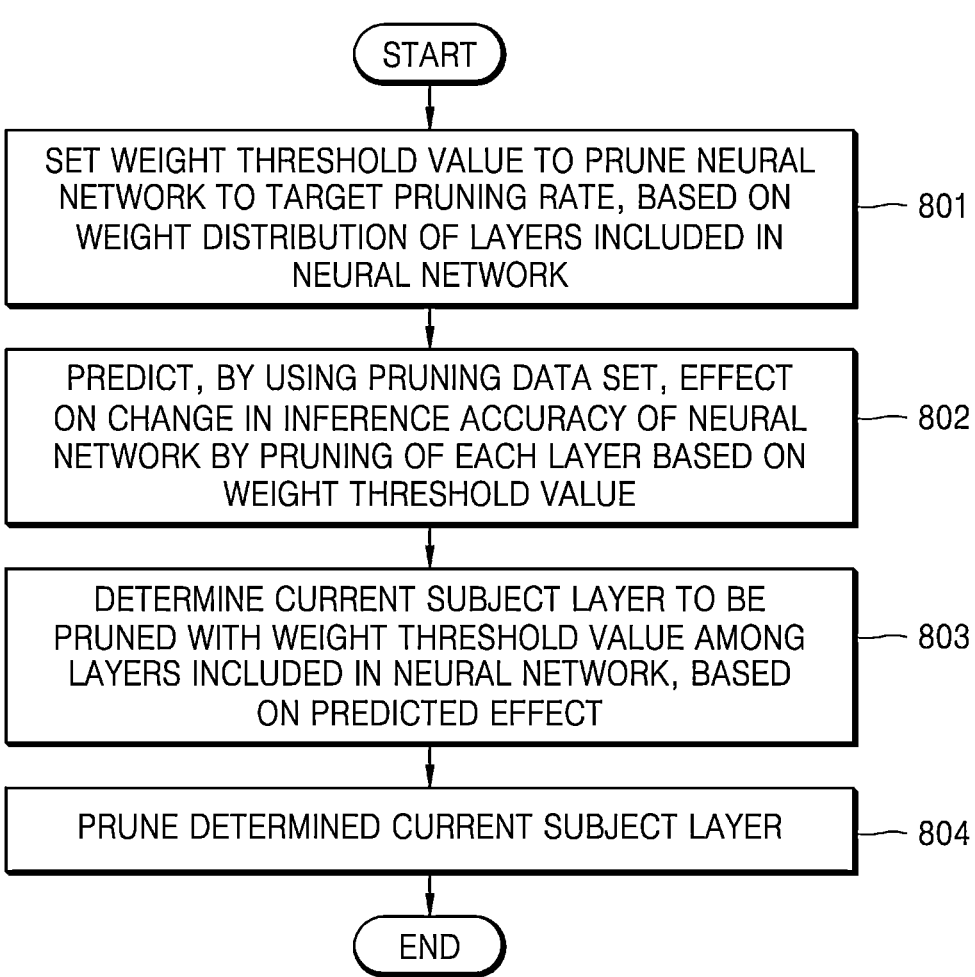
FIG. 8 illustrates an example of a flowchart of a method of performing pruning of a neural network, in accordance with one or more embodiments.

FIG. 8 illustrates a flowchart of a method of performing pruning of a neural network, in accordance with one or more embodiments. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here. Since the method of FIG. 8 is related to the examples described in the above drawings, the descriptions given above, but omitted herein, may be applied to the method of FIG. 8.

In operation 801, the processor 110 sets a weight threshold value to prune a neural network to a target pruning rate, based on the weight distribution of layers included in a neural network.

In operation 802, the processor 110 predicts, by using a pruning data set, an effect on a change in the inference accuracy of a neural network by the pruning of each layer based on the weight threshold value.

In operation 803, the processor 110 determines a current subject layer to be pruned with the weight threshold value among the layers included in a neural network, based on a predicted effect.

In operation 804, the processor 110 prunes the determined current subject layer.

When the pruning of a current subject layer is completed, the processor 110 repeatedly performs pruning on another layer of the neural network.

Table 1 below shows a simulation result of comparing accuracy between the methods according to the typical pruning process and an example embodiment pruning process where the pruning is performed without, for example, retraining. The simulation result of the example embodiment is a result of pruning a neural network of Inception-v3 by preparing a total of 1000 data sources by randomly extracting one data source from each of 1000 classes of an ImageNet database.

TABLE 1

|  | ThiNet (without retraining after pruning) | Threshold-based approach (without retraining after pruning) | The embodiment example (without retraining after pruning) |
|---|---|---|---|
| pruning rate (%) | 4.20 | 35.21 | 35.33 |
| Accuracy (%) | 67.96 | 11.21 | 76.19 |

The pre-pruned accuracy of the original Inception-v3 neural network of the one or more embodiments herein was 77.97%. As described above, according to the simulation, accuracy is considerably reduced in the typical methods in which pruning was performed without retraining, compared to the method of the example embodiment, having only about 1.78% of accuracy reduction. Accordingly, in the pruning method according to the one or more embodiments herein, even when a neural network is pruned without retraining, pruning of a high rate may be performed while reducing accuracy loss.

The neural network apparatuses, the neural network pruning apparatus 100, processor 110, memory 120, and other apparatuses, units, modules, devices, and other components described herein and with respect to FIGS. 1-8, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application and illustrated in FIGS. 1-8 are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method of one of more processors pruning a neural network, the method comprising:

generating a resultant pruned neural network, for reducing overfitting corresponding to the neural network, through a performing of plural pruning iterations by the one or more processors until a number of all layers of the neural network or at least all of the layers have been pruned, the plural pruning iterations respectively including:

determining, based on a weight distribution of layers included in the neural network, a weight threshold value to prune the neural network to a target pruning rate;

pruning plural layers of the neural network by the one or more processors based on the determined weight threshold value;

calculating a sensitivity of each of the layers corresponding to a change in inference accuracy of the neural network based on an input pruning data set;

determining, based on the calculated sensitivities, a current subject layer to be pruned among each of the layers of the neural network; and generating a pruned neural network by pruning the determined current subject layer to reduce a number of weight-based computations compared to the determined current subject layer in the neural network, wherein the generating of the pruned neural network comprises pruning the current subject layer by adjusting a pruning rate of weights of the current subject layer by updating the weight threshold value until a corresponding inference accuracy of the generated pruned neural network is decreased to a threshold accuracy.

2. The method of claim 1, wherein the generating of the resultant pruned neural network comprises performing the plural pruning iterations until an inference accuracy of the generated pruned neural network is determined to meet a target inference accuracy threshold.

3. The method of claim 1, wherein the determining of the current subject layer to be pruned comprises determining a subject layer that has a lowest sensitivity among the calculated sensitivities as the current subject layer to be pruned.

4. The method of claim 3, wherein the lowest sensitivity represents that the determined subject layer has a least effect on a decrease in an inference accuracy of a previously pruned neural network compared to an inference accuracy of a currently trained neural network.

5. The method of claim 1, wherein the change in the inference accuracy is predicted based on a difference between an inference accuracy for each of the layers before pruning on each layer is performed and an inference accuracy for each of the layers after pruning on each of the layers is performed.

6. The method of claim 1, wherein the determining of the weight threshold value comprises determining a weight value corresponding to the target pruning rate to be the weight threshold value when the weight distribution corresponds to a standard normal distribution.

7. The method of claim 1, wherein the updating of the weight threshold value comprises increasing a current weight threshold value when the corresponding inference accuracy of the generated pruned neural network that includes weights pruned to the current weight threshold value is not decreased to the threshold accuracy.

8. The method of claim 1, wherein the input pruning data set comprises one of a data set generated by randomly extracting a predetermined number of data sources for each class included in a given data set, or a data set generated by selecting valid classes from the given data set and randomly extracting a predetermined number of data sources for each selected valid class.

9. The method of claim 1, wherein the generating of the pruned neural network is performed without retraining of the pruned neural network using the input pruning data set.

10. A neural network apparatus comprising:

one or more processors configured to execute computer-readable instructions; and one or more memories storing the computer-readable instructions, which when executed by the one or more processors configure the one or more processors to generate a resultant pruned neural network, for reducing overfitting corresponding to the neural network, through a performing of plural pruning iterations by the one or more processors until a number of all layers of the neural network or at least all of the layers have been pruned, the plural pruning iterations respectively including:

a determination, based on a weight distribution of layers included in the neural network, of a weight threshold value to prune the neural network to a target pruning rate;

a pruning of plural layers of the neural network by the one or more processors based on the determined weight threshold value;

a calculation of a sensitivity of each of the layers corresponding to a change in inference accuracy of the neural network based on an input pruning data set;

a determination, based on the calculated sensitivities, of a current subject layer to be pruned among each of the layers of the neural network; and a generation of a pruned neural network by pruning the determined current subject layer, to reduce a number of weight-based computations compared to the determined current subject layer in the neural network, wherein the generating of the pruned neural network comprises pruning the current subject layer by adjusting a pruning rate of weights of the current subject layer by updating the weight threshold value until a corresponding inference accuracy of the generated pruned neural network is decreased to a threshold accuracy.

11. The apparatus of claim 10, wherein the plural pruning iterations is repeated until an inference accuracy of the generated pruned neural network is determined to meet a target inference accuracy threshold.

12. The apparatus of claim 10, wherein the one or more processors are further configured to determine a subject layer that has a lowest sensitivity among the calculated sensitivities as the current subject layer to be pruned.

13. The apparatus of claim 12, wherein the lowest sensitivity represents that the determined subject layer has a least effect on a decrease in an inference accuracy of a previously pruned neural network compared to an inference accuracy of a currently trained neural network.

14. The apparatus of claim 10, wherein the change in the inference accuracy is predicted based on a difference between an inference accuracy for each of the layers before pruning on each layer is performed and an inference accuracy for each of the layers after pruning on each of the layers is performed.

15. The apparatus of claim 10, wherein the one or more processors are further configured to determine a weight value corresponding to the target pruning rate to be the weight threshold value when the weight distribution corresponds to a standard normal distribution.

16. The apparatus of claim 10, wherein the one or more processors are further configured to increase a current weight threshold value when the corresponding inference accuracy of the generated pruned neural network that includes weights pruned to the current weight threshold value is not decreased to the threshold accuracy.

17. The apparatus of claim 10, wherein the input pruning data set comprises one of a data set generated by randomly extracting a predetermined number of data sources for each class included in a given data set, or a data set generated by selecting valid classes from the given data set and randomly extracting a predetermined number of data sources for each selected valid class.

18. The apparatus of claim 10, wherein the generation of the pruned neural network is performed without retraining of the pruned neural network using the input pruning data set.

* * * * *